US009477713B2

(12) United States Patent
Alvino et al.

(10) Patent No.: US 9,477,713 B2
(45) Date of Patent: Oct. 25, 2016

(54) SELECTING AND ORDERING GROUPS OF TITLES

(71) Applicant: Netflix, Inc., Los Gatos, CA (US)

(72) Inventors: Christopher Alvino, Campbell, CA (US); Carlos Gomez-Uribe, Campbell, CA (US); Che Hammond, Morgan Hill, CA (US); Janis Stipins, III, Gilroy, CA (US)

(73) Assignee: Netflix, Inc., Los Gatos, CA (US)

( * ) Notice: Subject to any disclaimer, the term of this patent is extended or adjusted under 35 U.S.C. 154(b) by 218 days.

(21) Appl. No.: 14/298,765

(22) Filed: Jun. 6, 2014

(65) Prior Publication Data

US 2015/0356087 A1    Dec. 10, 2015

(51) Int. Cl.
*G06F 17/30* (2006.01)
*G06Q 30/02* (2012.01)
*G06Q 30/06* (2012.01)

(52) U.S. Cl.
CPC ........... *G06F 17/3053* (2013.01); *G06Q 30/02* (2013.01); *G06Q 30/0631* (2013.01); *G06F 17/30554* (2013.01); *G06F 17/30864* (2013.01)

(58) Field of Classification Search
CPC ..................... G06Q 30/0256; G06Q 30/0631; G06Q 30/02; G06F 17/30864; G06F 3/0482; G06F 17/30554; G06F 17/3053
USPC ........................................................ 707/709
See application file for complete search history.

(56) References Cited

U.S. PATENT DOCUMENTS

| | | | | |
|---|---|---|---|---|
| 5,886,691 A | * | 3/1999 | Furuya | H04N 7/17354 348/E7.075 |
| 7,174,347 B1 | * | 2/2007 | Reed | G06F 17/30342 |
| 7,443,418 B2 | * | 10/2008 | Bryant | G06Q 40/04 348/207.1 |
| 7,756,753 B1 | * | 7/2010 | McFarland | G06Q 30/02 705/26.1 |
| 7,840,986 B2 | * | 11/2010 | Ali | G11B 27/105 725/105 |
| 8,577,671 B1 | * | 11/2013 | Barve | G06F 17/30522 370/352 |
| 8,631,097 B1 | * | 1/2014 | Seo | G06F 17/30905 709/203 |
| 8,700,448 B2 | * | 4/2014 | Bertram | G06Q 30/02 701/438 |
| 9,129,296 B2 | * | 9/2015 | Goldman | G06Q 50/01 |
| 2002/0154157 A1 | * | 10/2002 | Sherr | G06F 21/10 715/716 |

(Continued)

FOREIGN PATENT DOCUMENTS

EP    2717 180 A1    4/2014

OTHER PUBLICATIONS

International Searching Authority, "Search Report" in application No. PCT/US2015/032473, dated Jul. 30, 2015, 9 pages.

(Continued)

*Primary Examiner* — Thanh-Ha Dang
(74) *Attorney, Agent, or Firm* — HIckman Palermo Becker Bingham LLP

(57) ABSTRACT

Techniques for selecting and ordering groups of titles to present as recommendations. In one embodiment, for example, a method performed by one or more computing devices of an online services comprises selecting, for each of a plurality of row positions, a group of titles to fill the row position based at least in part on a relevance score computed for the group of titles. The relevance score is based at least in part on a personalized ranking for a particular user of titles in the groups in titles selected to fill the row positions. The groups of titles selected to fill to the row positions are presented as recommendations to the particular user as a sequence of rows in which each row in the sequence corresponds to one of the selected groups of titles.

21 Claims, 4 Drawing Sheets

(56) References Cited

U.S. PATENT DOCUMENTS

| | | | |
|---|---|---|---|
| 2004/0054572 A1* | 3/2004 | Oldale | G06F 17/30699 706/1 |
| 2004/0243527 A1 | 12/2004 | Gross | |
| 2007/0154168 A1* | 7/2007 | Cordray | H04N 5/76 386/230 |
| 2007/0154169 A1* | 7/2007 | Cordray | H04N 5/44543 386/230 |
| 2008/0126303 A1* | 5/2008 | Park | G06F 17/30828 |
| 2009/0083126 A1* | 3/2009 | Koren | G06Q 30/02 705/7.29 |
| 2009/0177989 A1* | 7/2009 | Ma | G06F 3/0482 715/766 |
| 2011/0072012 A1* | 3/2011 | Ah-Pine | G06F 17/30274 707/725 |
| 2011/0209185 A1* | 8/2011 | Cho | H04N 7/17318 725/93 |
| 2012/0066214 A1* | 3/2012 | Nelke | G06F 17/10 707/723 |
| 2012/0102410 A1* | 4/2012 | Gewecke | G06F 17/30029 715/738 |
| 2012/0310787 A1* | 12/2012 | Gaikwad | G06Q 30/0601 705/27.1 |
| 2013/0013372 A1* | 1/2013 | Gomez Uribe | G06Q 30/0201 705/7.29 |
| 2013/0262080 A1* | 10/2013 | Marciano | G06F 17/2836 704/3 |
| 2013/0325627 A1* | 12/2013 | Kimmerling | G06F 17/30386 705/14.66 |
| 2014/0223480 A1* | 8/2014 | Berry | H04N 21/4668 725/40 |
| 2014/0317073 A1* | 10/2014 | Jain | G06F 17/3053 707/706 |
| 2015/0074728 A1* | 3/2015 | Chai | G06F 3/0481 725/61 |
| 2015/0269231 A1* | 9/2015 | Huynh | G06F 17/30864 707/722 |

OTHER PUBLICATIONS

Claims in application No. PCT/2015/032473 dated Jul. 2015, 5 pages.

* cited by examiner

SELECTING AND ORDERING GROUPS OF TITLES

FIELD OF THE INVENTION

The present invention relates generally to computer-implemented techniques for selecting and ordering groups of titles.

BACKGROUND

Online services exist for consuming digital media content. Digital media content includes movies, television, music, books, magazines, photos, graphics, and other digital media content. Consumption of digital media content by an online visitor to these services can take a variety of forms, possibly depending on the type of digital media content and other factors. Some possible consumption forms include downloading, streaming, viewing, reading, listening to, or otherwise consuming the content.

Some of the online services are subscription-based, requiring visitors to periodically pay a subscription fee to consume digital media content from the service. For example, an online video streaming service may charge visitors a monthly subscription fee to stream digital video from the service. Other services charge a per-transaction fee to consume digital media content. For example, an online music store may charge a fee for each digital song purchased from the online store. Other payment and subscription models are possible.

An online service may offer a wide selection of consumable digital media content from which an online visitor to the service can choose from. Further, the service may frequently update the content available from the service with new content. As a result, the online visitor may visit the service with a general intent to consume digital content but without any specific digital media content in mind.

To help the online visitor choose specific digital media content to consume, the service may implement a recommendation algorithm that attempts to predict which of the available digital media content the online visitor might like to consume. Such predication may be based, for example, on digital media content the online visitor previously consumed from the service. The service may present recommended digital media content to the online visitor, for example, on a web page. Ideally, the recommendation algorithm will recommend digital media content the online visitor wants to consume.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims section appended hereto provides a useful summary of some embodiments of the present invention.

DETAILED DESCRIPTION

Figure 1:
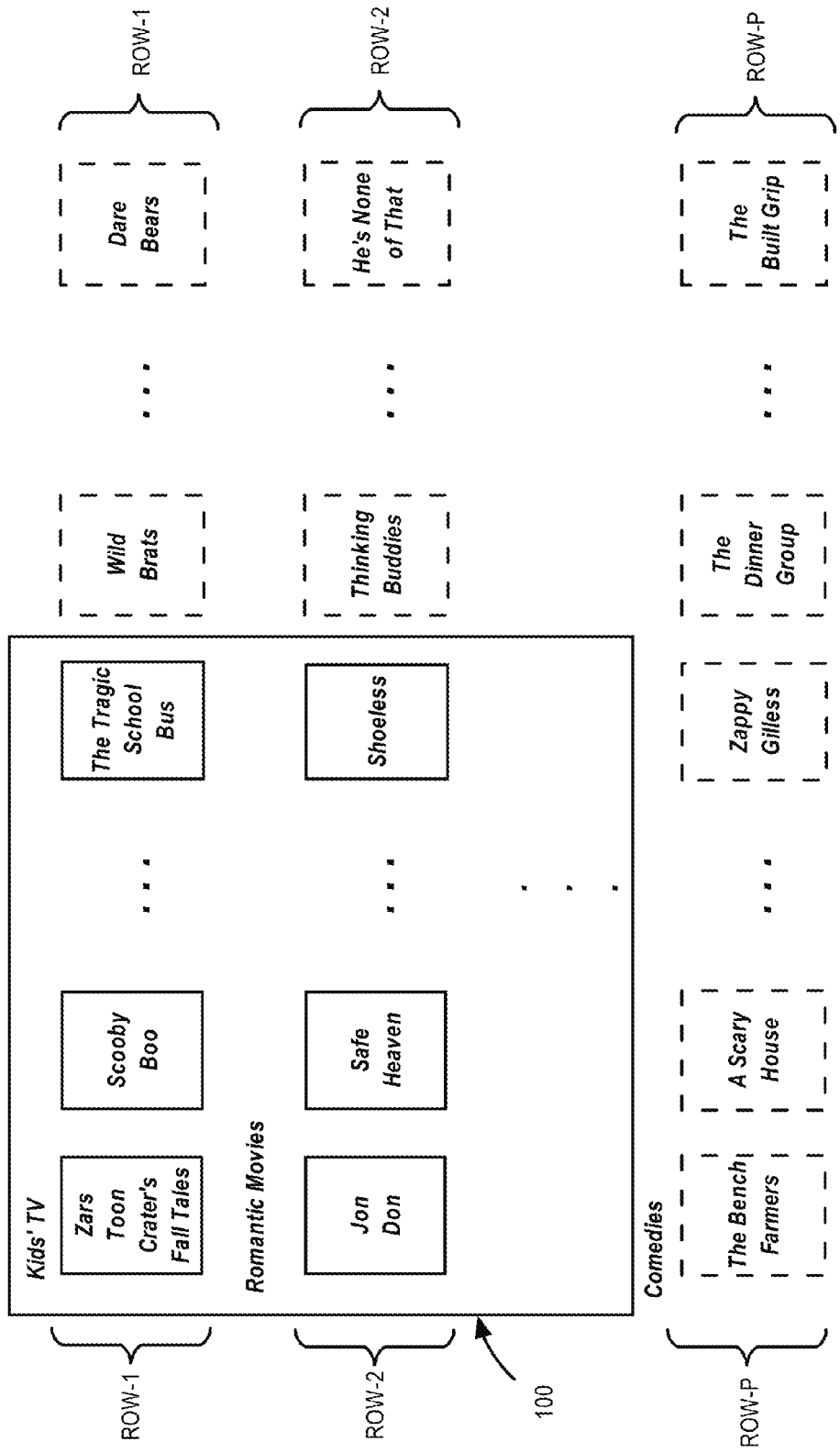
FIG. 1 illustrates selected and ordered groups of titles presented as a sequence of rows of titles, according to an embodiment of the present invention.

Referring to the figures, exemplary embodiments of the invention will now be described. In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

The exemplary embodiments are primarily described with reference to block diagrams of flowcharts. As to the flowcharts, each block within the flowcharts represents both a method step and an apparatus element for performing the method step. Depending upon the requirements of the particular implementation at hand, the corresponding apparatus element may be configured in hardware, software, firmware, or combinations thereof.

Overview

Computer-implemented techniques for selecting and ordering semantically meaningful groups of titles are described. The selected and ordered groups may be presented as recommendations to an online visitor of an online service for consuming the titles. For example, the selected and ordered groups may be presented on a web page as a sequence of rows of titles starting from the top of the web page and proceeding downward in which each row of titles corresponds to one of the selected groups of titles and the row presented at the top of the web page corresponds to the group selected first in the ordering of the selected groups, the next row in the sequence corresponds to the next selected group in the ordering, and so on.

While in some embodiments the selected and ordered groups are presented on a web page displayed by a web browser application, the selected and ordered groups are presented in graphical user interfaces displayed by other types of applications in other embodiments. For example, the selected and ordered groups may be presented in a graphical user interface displayed by an application designed to execute on a specific type of computing device such as, for example, a particular tablet computing device (e.g., an APPLE IPAD, an SAMSUNG GALAXY TAB, or an AMAZON KINDLE), a particular smart phone (e.g., an APPLE IPHONE or an ANDROID-based smart phone), a particular set-top device (e.g., a ROKU PLAYER), or particular gaming console (e.g., a SONY PS3, a MICROSOFT XBOX, or a NINTENDO WII).

Further, other presentations of the selected and ordered groups are possible and the techniques are not limited to presenting the selected and ordered groups of titles as a sequence of rows ordered top to bottom. For example, the sequence of rows may be ordered bottom to top, or the selected and ordered groups presented as a sequence of columns ordered left to right, or right to left.

As used herein, a "title" refers to titled digital media content consumable from the online service. For example, a title may refer to a movie, a television show, a television series, an episode within a television series, a season within a television series, a song, an album, a video, a video short, a book, a series of books, a magazine, an issue of a magazine, etc., depending on the type of digital media content to which the title refers.

A title may be consumed from the online service in a variety of different ways, depending on the type of digital media content and the manner of consumption requested by the online visitor and allowed by the online service. For example, a title may be consumed by downloading, streaming, viewing, previewing, reading, listening, playing, or otherwise consuming the digital media content from the online service, depending on the type of digital media content and the manner of consumption requested of and allowed by the online service.

The techniques include selecting and ordering groups of titles that have been grouped together into semantically meaningful groups. For example, a group of titles may be formed based on a criterion that groups titles together. For example, a group of titles may contain titles that belong to a consistent genre or sub-genre, or titles that are similar to a title previously consumed by an online visitor, or titles deemed to be most relevant to the online visitor, or titles made recently available for consumption from the online service, or titles grouped together based on some other grouping criterion.

The techniques are not limited to any particular grouping criteria or criterion and any criteria or criterion suitable for grouping available titles into groups may be used according to the requirements of the particular implementation at hand. Further, a title may belong to just one group or more than one group. Further still, groups may have the same number of titles or different numbers of titles.

In one embodiment, the techniques include a greedy selection and ordering algorithm performed by one or more computing devices of the online service. The greedy algorithm initially includes determining a candidate set of groups of titles. For example, the candidate set can include groups collectively covering all of the titles available for consumption from the online service or a subset thereof that have been grouped together in semantically meaningful groups.

The greedy algorithm further includes selecting a group of titles from the candidate set of groups of titles for each row position in an ordered set of available row positions. Once a group of titles is selected for a row position, the row position is considered filled.

The number of available row positions may correspond, for example, to a number of rows of titles to display on a web page, or at a particular device. In the web page case, for example, the first available row position may correspond to the row of titles to display at the top of the web page, the next available row position may correspond to the row of titles to display immediately below the top row, and so on, down to the last available row position which may correspond to the row of titles to display at the bottom of the web page.

According to the greedy algorithm, before selecting a group of a titles for an available row position, a row score for each group of titles in the set of candidate groups of titles is computed, except for perhaps the groups of titles that have already been selected to fill available row positions. In one embodiment, the row score for a candidate group of titles is computed as a weighted combination of a relevance score, a diversity score, and a coverage score. The relevance score reflects the relevance of titles in the candidate group to the online visitor. The diversity score reflects the similarity between titles in the candidate group to titles in groups that have already been selected to fill available row positions. The coverage score reflects the similarly between titles in the candidate group and titles the user has interacted positively with in the past (e.g., titles the user has consumed, recommended, or liked). Techniques for computing the row score for a candidate group of a titles, including the relevance score, the diversity score, and the coverage score for the candidate group, are described in greater detail hereinafter.

The greedy algorithm ends when all available row positions have been filled with groups of titles selected from the candidate set based on their computed row scores. The result is an ordered set of groups of titles that may be presented to the online visitor as recommendations, for example, on a web page. The recommendations include a diverse set of titles that are relevant to the online visitor and provide broad coverage of titles the online visitor might want to consume, thereby increasing the probability that a title is recommend that the online visitor will want to consume.

In an alternative embodiment, the techniques include a k-step look-ahead selection and ordering algorithm performed by one or more computing devices of the online service. According to the k-step look-ahead algorithm, like with the greedy algorithm, a group of titles is selected for an available row position from the candidate groups of titles based on its row score. However, instead of considering just the current row position, the K-step look-ahead procedure also considers the next K-1 row positions. The candidate group of titles selected to fill the current row position is the one that jointly optimizes the current row position and the next K-1 row positions based on a sum of row scores. The greedy algorithm may be viewed as a special case of the K-step look-ahead algorithm where K=1.

Presenting Selected and Ordered Groups of Titles

Before discussing in greater detail the greedy algorithm, the k-step look-ahead algorithm, and computing row scores, an example of how a set of selected and ordered groups of titles can be presented to an online visitor of the online service will be described. In this example, the titles are movies and television series and the online service is an online streaming video service. However, the titles could just as easily be other types of titles and the online service another type of online service. For example, the online service could just as easily be an online music store and the titles individual songs and albums.

Turning now to FIG. 1, it illustrates selected and ordered groups of titles presented as a sequence of rows of titles, according to an embodiment of the present invention. Box 100 represents a viewable area of a video display screen of, or that is operatively coupled to, a personal or consumer computing device used by the online visitor. The viewing area may correspond to a web browser window, a graphical user interface window, the entire video display screen, or some other portion of the video display screen. The computing device may be virtually any personal or consumer computing device such as a desktop computer, a laptop computer, a tablet computer, a video gaming console, a smart television, a step-top device, or other personal or consumer computing device having, or being operatively coupled to, a video display screen.

In the example of FIG. 1, there are P number of available row positions. Each row position 1, 2, . . . , P is filled with a group of titles selected from a set of candidate groups of titles according to the greedy or k-step look-ahead algorithm thereby forming a sequence of rows 1, 2, . . . , P ordered top to bottom with respect to the viewing area 100. The row of titles labeled "Kids' TV" displayed in the viewable area 100 represents the group of titles selected according to the greedy or k-step look-ahead algorithm to fill row position 1 (labeled ROW-1 in FIG. 1), the row labeled "Romantic Movies" displayed in the viewable area 100 represents the group of titles selected according to the greedy or k-step look-ahead algorithm to fill row position 2 (labeled ROW-2), and so on, down to the row of titles labeled "Comedies", which is currently not displayed within viewable area 100, and which represents the groups of titles selected according to the greedy or k-step look-ahead algorithm to fill row position P (labeled ROW-P).

While in some embodiments the available row positions are ordered top to bottom with respect to a horizontal edge of the viewable area 100, the available row positions are ordered bottom to top with respect to the horizontal edge of the viewable area 100 in other embodiments. Here, horizontal refers to a plane parallel to the online visitor's eyes regardless of the orientation of the viewable area 100.

Further, while in some embodiments the selected and ordered groups of titles are displayed in rows, the selected and ordered groups of titles are displayed in columns in other embodiments. Accordingly, reference to "row" in this description can be substituted with "column" without loss of generality. In the case selected and ordered groups of titles are displayed in columns, the columns can be ordered left to right with respect a vertical edge of the viewable area 100. Alternatively, the columns can be ordered right to left with respect to the vertical edge. Here, vertical refers to a plane perpendicular to the horizontal as defined above.

In this example, the number of available row positions P is greater than the number of rows that can be displayed within the viewable area 100. Accordingly, viewable area 100 may be vertically scrollable to reveal rows (e.g., ROW-P) that are currently not displayed in the viewable area 100. In this case, as the online visitor scrolls downward and higher ordered rows (e.g., ROW-P) are displayed within the viewable area 100, lowered ordered rows (e.g., ROW-1) are no longer displayed in the viewable area 100. The online visitor can scroll upward to reveal the lowered ordered rows again.

Each group of titles selected to fill an available row position comprises a number of titles, generally designated k in FIG. 1. While in some embodiments each selected group of titles includes the same number of titles, selected groups of titles include different numbers of titles in other embodiments. Further, there is no requirement that a title included in one selected group of titles cannot also be included in another selected group of titles. For example, the same movie title may be included in both a "Comedies" group of titles and a "Romantic Movies" group of titles. Notwithstanding this, there may be no title overlap between selected groups of titles. In some embodiments, duplicates of a title in the groups of titles selected to fill the available row positions are removed before presenting the selected groups of titles to a user such that there is no title overlap between the groups of titles presented to the user.

A title in a row can be represented within a viewable area, for example viewable area 100, in any suitable graphical manner and no particular graphical manner is required of the invention. For example, a title can be represented with a digital image, an animated image, a video, an icon, a graphic, text, or some combination thereof.

In some embodiments, the graphical representation of a title in a row is interactive allowing the online visitor to take or initiate a consumption action with respect to the title. For example, the interactive graphical representation of a title in a row, when activated (e.g., with a mouse click or a touch gesture), may allow the online visitor to begin playing the title, view a short description of the title, see a preview of the tile, or otherwise begin consuming the title. In the example of FIG. 1, each television and movie title is represented with an interactive "box shot" image which contains the text of the title and possibly other visual indications of the content of the title such as might be seen on a DVD or Blu-Ray case or in a movie poster, advertisement, or other visual promotional material. The online view visitor may being streaming a title by interacting with the box image. Such interaction may involve standard user input such as striking one or more keys on a keyboard, one or more mouse clicks using a computer mouse, or one or more touch gestures on a touch-sensitive surface (e.g., a touch-screen display).

While in some embodiments as exemplified in FIG. 1 the graphical representations of titles in the rows are roughly the same visual size, graphical representations of titles are presented in different sizes in other embodiments.

In some embodiments as exemplified in FIG. 1, each row displayed within a viewable area is labeled to indicate how titles displayed in the row relate to each other. In other words, the label indicates a common semantic theme that applies to all titles in the group of titles selected to fill the row position. For example, titles in row ROW-1 are children's television programs as indicated by the label "Kids' TV" and titles in row ROW-2 are romantically-themed movies as indicated by the label "Romanic Movies.

In addition to the viewable area 100 being vertically scrollable, each row of titles may also be separately horizontally scrollable with a carousal like effect. For example, the row of titles ROW-2 labeled "Romantic Movies" may be scrollable horizontally and separately from the rows of titles ROW-1 label "Kids' TV". Accordingly, as the online visitor horizontally scrolls row ROW-2 to the right, the graphical representations of titles ("Jon Don", "Safe Heaven", . . . , "Shoeless") currently displayed in the viewable area 100 move toward the right edge of the viewable area, with the rightmost of those graphical representation ("Shoeless") moving off the right edge of the viewable area 100 and with the graphical representation of the title "He's None of That" moving onto the viewable area 100 from the left edge of the viewable area 100. Conversely, if the online visitor horizontally scrolls row ROW-2 to the left, the graphical representations of titles ("Jon Don", "Safe Heaven", . . . , "Shoeless") currently displayed in the viewable area 100 move toward the left edge of the viewable area, with the leftmost of those graphical representations ("Jon Don") moving off the left edge of the viewable area 100 and with the graphical representation of the title "Thinking Buddies" moving onto the viewable area 100 from the right edge of the viewable area 100. Here, left and right are planes parallel to the vertical as defined above.

Titles within a selected group of titles may be ordered and the row of titles displayed for that group may reflect the order. For example, the display of ROW-1 reflects that the title "Zars Toon Crater's Fall Tales" is the first ordered title in the group of titles represented by ROW1, the title "Scooby Boo" is the second ordered title in the group, and so on, to the title "Dare Bears", the last ordered title in the group. Titles may be ordered within a group of titles in virtually any manner and the techniques herein for selecting and ordering groups of titles are not limited to any particular manner of ordering titles within groups.

In FIG. 1, horizontally oriented ellipses in a row are used to indicate that there may be more titles within that row than is shown between the titles that book-end the ellipses. The vertically oriented ellipses in FIG. 1 are used to indicate that there may be more rows between ROW-2 and ROW-P than is shown in FIG. 1.

In one non-limiting practical embodiment, the number of available row positions P and the maximum number of titles k in one of the P rows each ranges between approximately 5 and 75.

While in some embodiments as exemplified by FIG. 1 rows are displayed in a rectangular grid fashion, rows are offset differently from a vertical edge of the viewable area 100 in other embodiments. For example, in FIG. 1, the first ordered title in ROW-1 "Zars Toon Crater's Fall Tales" is offset the same distance from the left edge of the viewable area 100 as the first ordered title in ROW-2 "Jon Don" and so that the first ordered title in ROW-1 "Zars Toon Crater's Fall Tales" is in the same visual column as the first ordered title in ROW-2 "Jon Don", the second ordered title in ROW-1 "Scooby Boo" is in the same visual column as the second ordered title in ROW-2 "Safe Heaven", and so on. However, the first ordered title in ROW-2 "Jon Don" could just as easily be offset differently from the left edge of viewable area 100 from the first ordered title in ROW-1 "Zars Toon Crater's Fall Tales" so that, for example, the first ordered title in ROW-2 "Jon Don" is in the same visual column as the second ordered title in ROW-1 "Scooby Boo", the second ordered title in ROW-2 "Safe Heaven" is in the same visual column as the third ordered title in ROW-1, and so on. Other offset arrangements are possible and the visual arrangement of rows is not limited to the rectangular grid arrangement of FIG. 1 or any other particular arrangement.

The viewable area 100 may present information other than rows of titles and labels for rows including information in between rows of titles such as advertisements or other information.

Greedy Algorithm

In some embodiments, one or more computing devices of an online service perform a "greedy" algorithm for selecting and ordering groups of titles. The algorithm involves considering an ordered set of a number, P, of available row positions. In some embodiments, the row positions are ordered based on where in a graphical user interface a user is most likely to initially place his or her focus. For example, row position 1 may correspond to the top of a web page and row position P may correspond to the bottom of the web page. By selecting the best scoring candidate group of titles to fill the row position where the user is most likely to initially place his or her focus, the probability the user is presented a title the user will want to consume is increased.

Figure 2:
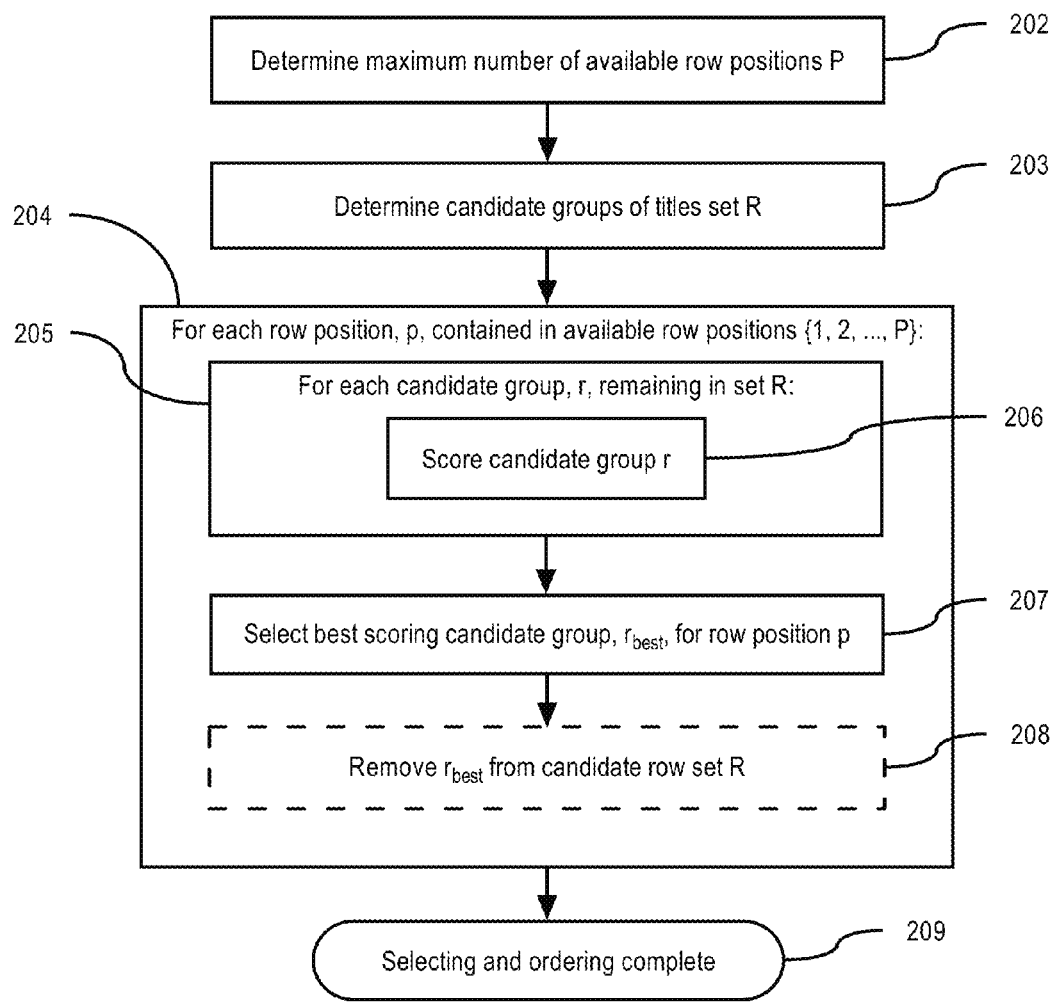
FIG. 2 is a flowchart illustrating steps of a greedy algorithm for selecting and ordering groups of titles, according to an embodiment of the present invention.

According to the greedy algorithm, a group of titles is selected from a set of candidate groups of titles for each row position based on row scores computed for the candidate groups of titles. The term "greedy" refers to selecting the best scoring candidate group of titles to fill an available row position that has not already been selected to fill a lower ordered row position. FIG. 2 is a flow diagram illustrating the greedy selection and ordering algorithm in more detail, according to an embodiment of the invention.

In particular, FIG. 2 is a flow diagram illustrating steps of a greedy algorithm for selecting and ordering groups of titles in accordance with some embodiments. As one skilled in the art will recognize from the following description, some of the steps can be performed in a different order than is shown in FIG. 2, or performed concurrently with one another, or not performed altogether. For example, one skilled in the art will understand after reading the following description that step 203 can be performed concurrently with or before step 202. As another example, one skilled in the art will understand that step 208 need not be performed.

In an embodiment, the steps of the greedy algorithm are performed to select and order groups of titles for a given user of the online service. As the online service may have a number of users, the algorithm may be performed multiples times, at least once for each of multiple users. In this case, some steps may be performed only once for a set of users. For example, steps 202 and 203 may be performed only once for a set of users and steps 204, 205, 206, and 207 performed for each of the users in the set.

In this description, reference is made to actions or steps performed for a given user or online visitor. For example, reference is made to selecting and ordering groups of titles for a given user. However, such references to a singular user or a singular online visitor may be substituted with a reference to a given set of related users or online visitors (plural) without loss of generality. The set of users or online visitors may be related together in the set by one or more commonalities among the users or online visitors. Such commonalities may be established in demographic data for the users or online visitors, for example.

Returning to the greedy algorithm, once a set of groups of titles has been selected and ordered for a given user according to the greedy algorithm, the set may be presented to the given user as recommendations, for example, as a sequence of rows of titles on a web page or as part of another graphical user interface as in the example of FIG. 1.

When performing the greedy algorithm to select and order groups of titles for a given user, the algorithm can be performed while the user is online with the online service. For example, the algorithm can be performed in response to receiving a request from the user to view a home page or other web page of the online service in which recommendations are presented.

Alternatively, the algorithm can be performed while the user is offline. That is, the algorithm can be performed to select and order groups of titles for the given user outside the context of the user interacting with the online service. For example, the online service may perform the algorithm as part of an offline or batch processing task. In the offline case, a set of groups of titles may be pre-selected and ordered by the time the user requests a home page or other web page in which the set is presented as recommendations.

The algorithm may be performed multiple times for the same user over a period of time. For example, the algorithm may be performed for a given user at a first time to select and order a first set of groups of titles for the user. Then, at a later second time, the algorithm may be performed again for the user to select and order a second set of groups of titles for the user. The second set may be different than the first set depending on whether any inputs to the algorithm change from the first time it is performed for the user and the second time it is performed for the user. Any number of different events may trigger performing the algorithm again for a user including, for example, the passage of a predefined amount of time, detecting the user's interaction with the online service that changes an input or inputs to the algorithm, and/or detecting another data change that affects an input or inputs to the algorithm.

At step 202, a maximum number of available row positions P is determined. P may be predefined, pre-configured, or automatically selected based on a number of different factors. Generally, P is determined to be a number that corresponds to a maximum number of rows of titles to present to a user as recommendations. Note that since a web page on which recommendations are presented may be scrollable in at least the vertical direction (and also possibly in the horizontal direction) and/or each row of titles may be individually scrollable in the horizontal direction, P may be larger than the number of rows of titles that can be displayed at the same time within a viewable area of the web page. In one non-limiting embodiment, P is determined based exclusively or primarily on the physical size of a display screen or a class of display screens on which the selected groups of titles will be presented.

In the following description, lowercase letter p refers to a current available row position index in the set $\{1, 2, \ldots, P\}$, where uppercase letter P refers to the maximum number of available row positions determined at step 202.

At step 202, a set R of candidate groups of titles is determined. The set R may correspond to all available groups of titles, or some subset thereof. The set R may encompass all title available for consumption from the online service, or some subset thereof.

In one non-limiting practical embodiment, the set R includes approximately 10,000 groups of titles corresponding to various semantically meaningful title groupings. For example, if the online service provides an online video streaming service where users can stream movies and television programs, titles may be group together by genres/sub-genres such as, for example, "Romantic Movies", "Classic Movies", "Dark Movies", "Critically Acclaimed Movies", "Suspenseful Movies", "Gritty Movies", "Independent Movies", "Visually Striking Movies", "Violent Movies", "Feel-Good Movies", "Emotional Independent Sports Movies", "Cult Sports Movies", "Visually-striking Goofy Action & Adventure", among many other possible genres/sub-genres groupings. Different genre/sub-genre groupings may apply to different types of digital content such as digital books and digital music.

It should be understood that titles can be grouped together based on criteria other than genre and sub-genre classifications. For example, titles can be grouped together based on previous consumption activity. For example, a group of titles may be formed based on the similarity of titles to titles a given user has previously consumed. As another example, titles can be grouped together based on how recent the titles became available for consumption (e.g., a "New Releases" group of titles or "Recently Added" group of titles). As yet another example, titles can be grouped together based on social networking information obtained for the titles (e.g., a "Titles Your Friends Liked" group of titles). In general, titles may be grouped together in a variety of different ways and the present invention is not limited to any particular criteria or criterion for grouping titles together.

Each candidate group of titles, $r_i$, in the set R is an ordered set of titles, $r_i = (V_{i,1}, V_{i,2}, \ldots, V_{i,k})$, where i ranges between 1 and the number of candidate groups of titles in set R and k is number of titles in the candidate group of titles $r_i$. Typically, k differs per candidate group of titles. In some embodiments, how titles are ordered within a candidate group of titles is not a particular important. In these embodiments, titles may be ordered within a candidate group of titles in any manner. Note that while the ordering of titles within a candidate group of titles may not be especially important for the purpose of selecting and ordering groups of titles, the ordering of titles within a candidate group of titles may have importance for other reasons beyond the scope of this description.

At step 204, steps 205, 207, and optionally 208 are performed for each row position, p, contained in the ordered set of available row positions $\{1, 2, \ldots, P\}$.

At steps 205 and 206, for a current row position, p, a row score is computed at step 206 for each candidate groups of titles remaining in set R. In an embodiment, the row score computed for a candidate group of titles, r, measures one or more of three different characteristics of the candidate group r:

Relevance—How relevant titles in the candidate group, r, are to a given user.

Diversity—How titles in the candidate group, r, contribute to the overall diversity of titles already selected to fill available row positions less than p.

Coverage—How representative titles in the candidate group, r, are of titles that a given user has interacted with positively in the past.

In an embodiment, the row score computed for a candidate group of titles, r, is a weighted combination of a relevance score computed for the candidate group r, diversity score computed for the candidate group r, and a coverage score computed for the candidate group r. However, the row score computed for a candidate group r can be just the relevance score, a weighted combination of just the relevance score and the diversity score, or a weighted combination of just the relevance score and the coverage score.

In an embodiment, the relevance score for a candidate group of titles, r, is computed as a weighted sum of the relevance of the individual titles in the candidate group r to the given user. More detailed examples of computing a relevance score for a candidate group of titles, r, are provided below.

In an embodiment, the diversity score for a candidate group of titles, r, is a function of the title to title similarities between titles in the groups of titles already selected to fill available row positions less than p and titles in the candidate group r. More detailed examples of computing a relevance score for a candidate group of titles, r, are provided below.

In an embodiment, the coverage score for a candidate group of titles, r, is a function of title to title similarities between titles a given user has interacted positively with in the past, T, and titles in the candidate group r. Different sets of titles a given user has interacted positively with in the past T may be considered. For example, computing the coverage score may involve separately considering a set of titles to which the given user has given the highest (best) ratings, $T_{highest}$, and a set of titles the given user has most recently consumed, $T_{recent}$.

According to an embodiment, the row score computed for a candidate group of titles, r, is more formally defined as:

$$S(r; \{s_1, \ldots, s_{p-1}\}) = \alpha S_{Rel}(r) + \beta S_{Div}(r; \{s_1, \ldots, s_{p-1}\}) + \Sigma_{t \in T} \gamma_t S_{Con,t}(r; \{s_1, \ldots, s_{p-1}\})$$

In the above equation, $s_p$ refers to the candidate group of titles in set R selected to fill row position $p \in \{1, 2, \ldots, P-1\}$. As can been seen from the equation, the row score for a candidate group of titles r, the diversity score for the candidate group r, and the coverage score for the candidate group r, are each a function of (a) the candidate group of titles, r, for which the row score is being computed, and being considered for row position p, and also a function of (b) the candidate of groups of titles that have already been selected to fill available row positions less than p.

According to the above equation, the relevance score is a function of only the candidate group of titles, r, for row position p and not a function of the candidate of groups of titles that have already selected to fill available row positions less than p. Note that since the relevance score is a function of only the candidate group of titles, r, for row position p and not a function of the candidate groups of titles that have already selected to fill available row positions less than p, once the relevance score for a candidate group of titles, r, has been computed during the loop of step 204, it need not be computed again for the candidate group of titles, r, during the loop of step 204. Notwithstanding this, the relevance score for a candidate group of titles, r, may be computed again during the loop of step 204 if a title is removed from the group of titles, r, as a duplicate of another title in the candidate groups of titles already selected to fill available row positions less than p.

At step 207, once row scores have been computed for all candidate groups of titles remaining in set R and in consideration to fill row position p, the best scoring candidate group, $r_{best}$, is selected to fill row position p. In an embodiment, the best scoring candidate group, $r_{best}$, is the highest scoring candidate group according to the above row score equation.

At step 208, which is optional, the best scoring candidate group, $r_{best}$, selected at step 207 to fill row position p may be removed from set R before considering the next row position p+1, if p is less than P.

The greedy algorithm ends at step 209 once all available row positions {1, 2, . . . , P} have been filled with a candidate group of titles selected from set R.

Relevance

According to an embodiment, a relevance score for a candidate group of titles, r, is computed as a weighted sum of individual relevance scores for titles in the candidate group. More formally, the relevance score $S_{Rel.}$ (r) for a candidate group titles, r, is defined as follows:

$$S_{Rel.}(r) = \sum_{h=1}^{H} w_h S_{Rel.}(v_h)$$

Here, H is the number of titles in the candidate group r or the maximum number of titles in the candidate group r to display in the current row position p, $w_h$ is a weight assigned to a given title h in candidate group r, and $S_{Rel.}$ ($v_h$) is an individual relevance score for a given title h in candidate group r.

In an embodiment, the weight, $w_h$, assigned to a given title h depends on the importance of a title placed in horizontal position h in the current row p. Many possible alternatives exist for this weight, $w_h$, including, for example, uniform weighting by horizontal position or weighting based on a probability of consumption for each horizontal position. The present invention is not limiting to any particular manner of assigning weights to titles.

The individual relevance score $S_{Rel.}$ ($v_h$) for a given title h in a candidate group of titles r can be computed in a number of different ways and the present invention is not limited to any particular individual relevance score computation. In an embodiment, the individual relevance score $S_{Rel.}$ ($v_h$) for a given title h is a function of a given user's relevancy rank for the given title (i.e., a personalized rank) and a global relevancy rank for the given title (i.e., an un-personalized rank). One possible equation for computing the individual relevance score $S_{Rel.}$ ($v_h$) for a given title h is:

$$S_{Rel.}(v_h) = \left(\frac{1}{R(v_h)^\eta}\right) * \left(\frac{G(v_h)^\phi}{G(v_h)^\phi + R(v_h)^\phi}\right)$$

Here, $R(v_h)$ is the given user's relevancy rank (personalized rank) for the given title h and $G(v_h)$ is the global relevancy rank (un-personalized rank) for the given title h. The given user may be the user for which the relevance score $S_{Rel.}$ (r) for a candidate group titles, r, is being computed. The personalized relevancy rank $R(v_h)$ may be an integer from 1 to C, where C is at least the number of titles in the set of candidate groups of titles R. For example, C may be the total number of titles available for consumption from the online service. Thus, $R(v_h)$=1 for the most relevant title to the given user and $R(v_h)$=C for the least relevant title to the given user. Similarly, the un-personalized relevancy rank $G(v_h)$ may be an integer from 1 to C with $G(v_h)$=1 for the most globally relevant title and $G(v_h)$=C for the least globally relevant title.

The given user's personalized relevancy rank $R(v_h)$ for a given title h and the global un-personalized relevancy rank $G(v_h)$ for the given title h can be assigned based on a variety of different factors and the techniques of the present invention are not limited to any particular factor or set of factors. For example, the given user's personalized relevancy rank $R(v_h)$ for a given title h can be based on explicit rating information provided to the online service by the given user or inferred based on titles consumed by the given user in the past or other information that indicates the given user's preferences and tastes. Along the same lines, the global un-personalized relevancy rank $G(v_h)$ for the given title h can be based on explicit rating information provided to the online service by a set of undifferentiated users (e.g., all users of the online service) or inferred based on titles consumed by the set of undifferentiated users in the past or other information that indicates the preferences and tastes of the set of undifferentiated users. Users that are undifferentiated are not related together by some commonality other than perhaps that they are all subscribers or users of the online service.

Another possible equation for computing the individual relevance score $S_{Rel.}$ ($v_h$) for a given title h is:

$$S_{Rel.}(v_h) = \left(\frac{\rho}{\rho + R(v_h)}\right) * \left(\frac{\rho + R(v_h)}{\rho + G(v_h)}\right)^{1-\theta}$$

In the above two equations for computing the individual relevance score $S_{Rel.}$ ($v_h$) for a given title h, both $\eta$ and $\rho$ are greater than zero and control the steepness of the function between (a) the given user's personalized relevancy rank $R(v_h)$ for the given title h and the global un-personalized relevancy rank $G(v_h)$ for the given title h and (b) the individual relevance score for the $S_{Rel.}$ ($v_h$) for the given title h.

In the above two equations, $\phi$ and $\theta$ are each parameters that control the relative level of impact the given user's personalized relevancy rank $R(v_h)$ for the given title h has on the individual relevance score for the $S_{Rel.}$ ($v_h$) for the given title h with respect to the impact the global un-personalized relevancy rank $G(v_h)$ for the given title h has on the individual relevance score for the $S_{Rel.}$ ($v_h$) for the given title h. For example, where $\phi$ equals zero, the global un-personalized relevancy rank $G(v_h)$ for the given title h has no impact on the individual relevance score $S_{Rel.}(v_h)$ for the given title h.

On the other hand, where $\phi$ is greater than zero, the individual relevance score $S_{Rel.}(v_h)$ for the given title h will be increased if the personalized relevancy rank $R(v_h)$ for the given title h is lower numerically (i.e., ranked higher) than the un-personalized relevancy rank $G(v_h)$ for the given title h, and the individual relevance score relevance score $S_{Rel.}(v_h)$ for the given title h will be decreased if the personalized relevancy rank $R(v_h)$ for the given title h is higher numerically (i.e., ranked lower) than the un-personalized relevancy rank $G(v_h)$ for the given title h.

Where $\phi$ is less than zero, the situation is reversed from where $\phi$ is greater than zero. In particular, the individual relevance score $S_{Rel.}(v_h)$ for the given title h will be decreased if the personalized relevancy rank $R(v_h)$ for the given title h is lower numerically (i.e., ranked higher) than the un-personalized relevancy rank $G(v_h)$ for the given title h, and the individual relevance score $S_{Rel.}(v_h)$ for the given title h will be increased if the personalized relevancy rank $R(v_h)$ for the given title h is higher numerically (i.e., ranked lower) than the un-personalized relevancy rank $G(v_h)$ for the given title h.

For example, in the case where $\phi$ is greater than zero, $\phi$ gives a boost to a title's contribution when computing the individual relevance score for the title if the title is ranked personally more relevant than it is in the un-personalized ranking, and likewise decreases the title's contribution to the individual relevance score for the title if the title is ranked personally less relevant than it is in the un-personalized ranking. For example, if a globally popular title ranks at position 100 (i.e., ranked relatively low) in the personalized ranking of titles for a given user, but in the global un-personalized ranking the title ranks at position 5 (i.e., ranked relatively high), then 4), when set to be greater than 4), would decrease the globally popular title's contribution to the individual relevance score more than it would if the title ranked at position 100 in the personalized ranking was as not globally popular.

The relevancy-rank based scoring of titles allows the individual relevance scoring function to be modular. That is, the individual relevance score $S_{Rel.}(v_h)$ for a given title h can be computed without regard to how a given user's personalized relevancy rank $R(v_h)$ for the given title h is assigned or how the global un-personalized relevancy rank $G(v_h)$ for the given title is assigned. Thus, different metrics for assigning personalized and un-personalized relevancy ranks to titles may be used according to the requirements of the particular implementation at hand and the present invention is not limited to any particular method of assigning personalized and un-personalized relevancy ranks to titles.

Diversity

In an embodiment, a diversity score $S_{Div.}(r)$ for a candidate group of titles, r, in consideration to fill the current row position p is computed based on the candidate group of titles, r, and any candidate groups of titles $\{s_1, \ldots, s_{p-1}\}$ that have already been selected to fill row positions $\{1, 2, \ldots, p-1\}$.

In one embodiment, the diversity score $S_{Div.}(r)$ is computed by combining pairwise comparisons, up to a certain horizontal position n, of similarity between titles in candidate group of titles, r, under consideration and titles in any groups of titles $\{s_1, \ldots, s_{p-1}\}$ already selected to fill row positions $\{1, \ldots, p-1\}$.

One possible formula for combining pairwise comparisons is:

$$S_{Div.}(r;\{s_1,\ldots,s_{p-1}\}) = \Sigma_{k=1}^n w_k \Sigma_{h=1}^n \Sigma_{j=1}^{p-1} w_{hj} L(v_{s_j,h}, v_{i,k})$$

Here, $L(v_1, v_2)$ can be a function that describes how similar title $v_1$ is to title $v_2$. Many possible weightings of titles in the already selected groups of titles for row positions $\{1, \ldots, p-1\}$ are possible, along with many possible weightings of titles in the candidate group of titles, r, under consideration. In one embodiment, $L(v_1, v_2)$ is a monotonically decreasing function of the similarity rank between title $v_1$ and title $v_2$. For example, one possibility is to use $$L(v_1, v_2) = \frac{c}{c + R_{Sim.}(v_1, v_2) - 1},$$

where if titles were ranked from most similar (rank number 1) to least similar to title $v_1$, then $R_{Sim.}(v_1, v_2)$ would be the rank number of title $v_2$ in that ranking. However, virtually any definition of title to title similarity can be used to come up with a ranking without loss of generality.

Coverage

In an embodiment, the coverage score $S_{Cov.}(r)$ for a candidate group of titles, r, in consideration to fill the current row position p is a function of the similarity between titles comprising the candidate group of titles, r, under consideration and titles that a given user has interacted positively with in the past. Titles a given user has interacted with positively in the past may include titles the given user has, for example, consumed, rated highly, added to their personal consumption list (e.g., a personal playlist), or otherwise indicated an interest in.

An example of a possible coverage score function is to use the incremental coverage that the candidate group of titles under consideration, r, adds to the candidate groups of titles that have already been selected to row positions less than p. For example:

$$S_{Cov.,\tau}(r;\{s_1,\ldots,s_{p-1}\}) = \hat{S}_{Cov.,p}(\{r, r_{s_1},\ldots, r_{s_{p-1}}\}) - \hat{S}_{Cov.,\tau}(\{r_{s_1},\ldots, r_{s_{p-1}}\})$$

Here, the coverage score, $\hat{S}_{Cov.,\tau}(A)$, captures how well titles in the rows, A, cover titles that the given user has interacted positively with in the past. An example of such a function is:

$$\hat{S}_{Cov.,\tau}(A) = \frac{1}{|\tau|} \sum_{v \in \tau} w_t \max_{a \in V(A)} w_a L'(v, v_a)$$

In this example function, V(A) is the set of titles up to and including a certain fixed horizontal position for the rows in set A. A weight, $w_t$, can be placed depending on the title in $\tau$ and a weight, $w_a$, can be placed for the title in A. For $L'(v, v_a)$, a monotonically decreasing function of the similarity rank between titles v and $v_a$ can be used. An example monotonically deceasing function is $$L'(v, v_a) = \frac{c}{c + R_{Sim.}(v, v_a) - 1},$$

c is a positive constant, and $R_{Sim.}(v, v_a)$ is the similarity rank between titles v and $v_a$. Titles that the given user has interacted positively with more recently can be weighted higher. For example, such higher weighting can be done by choosing $w_t = \exp(-\lambda t_v)$ where $\lambda$ is a positive constant and $t_v$ is the time elapsed since the title has been interacted with (e.g., consumed, rated, added to playlist, etc.).

De-Duplication

In an embodiment, titles in a candidate group of titles, r, selected to fill row position p that are a duplicate of a title in a candidate group of titles already selected to fill a row position less than p are removed from the candidate group of titles, r, selected to fill row position p before the candidate of titles, r, is displayed as row. In one embodiment, up to a horizontal position d, removal of titles from row $s_p$ are considered if the titles have already appeared before or at horizontal position d in rows $s_1, \ldots, s_{p-1}$.

K-Step Look-Ahead Algorithm

In one embodiment, a K-step look-ahead procedure is performed in which the optimal candidate group of titles to place at row position p is determined based on considering the jointly optimal candidate groups of titles to place at row position p as well as the next K row positions, p+1, ..., p+K. In other words, for a given row position p, the K-step look-ahead procedure considers what is the best candidate group of titles in R to fill the current row position p given the joint sum of row scores for a candidate group of titles in R to fill the current row position p and one or more candidate groups of titles in R to fill the next K-1 row positions.

For example, the K-step look-ahead procedure can involve computing $$s_p = \operatorname*{argmax}_{i1 \in R} \max_{i2,\ldots,iK \in R} S(r_{i1}; \{s_1, \ldots, s_{p-1}\}) +$$
$$S(r_{i2}; \{s_1, \ldots, s_{p-1}, i1\}) + \ldots + S(r_{iK}; \{s_1, \ldots, s_{p-1}, i1, \ldots, i(K-1)\})$$

subject to the constraint where i1, i2, ..., iK are all distinct and where set R=[1, set R]−{$s_1, \ldots, s_{p-1}$} is the set of candidate groups of titles in set R not currently selected to fill available row positions. Candidate groups of titles can be scored according to a row scoring function such as the row scoring function described above.

The K-step look-ahead process is started at row position p=1 and continues until a candidate group of titles is selected for all row positions p=1 through p=P. When selecting a candidate group of titles to be placed at row position p, the set of candidate groups of titles {$s_1, \ldots, s_{p-1}$}, i.e., the sequence of candidate groups of titles selected for row positions p=1 through p=P, is referred to as the currently selected rows.

The greedy algorithm described above can be viewed as a special case of the K-step look-ahead algorithm. In particular, where K=1 the candidate group of titles with the best row score that hasn't already been selected is then selected for the next available row position p, i.e., $$s_p = \arg\max_{i \in [1,R]-\{s_1,\ldots,s_{P-1}\}} S(r_i).$$

Online Service Environment

Figure 3:
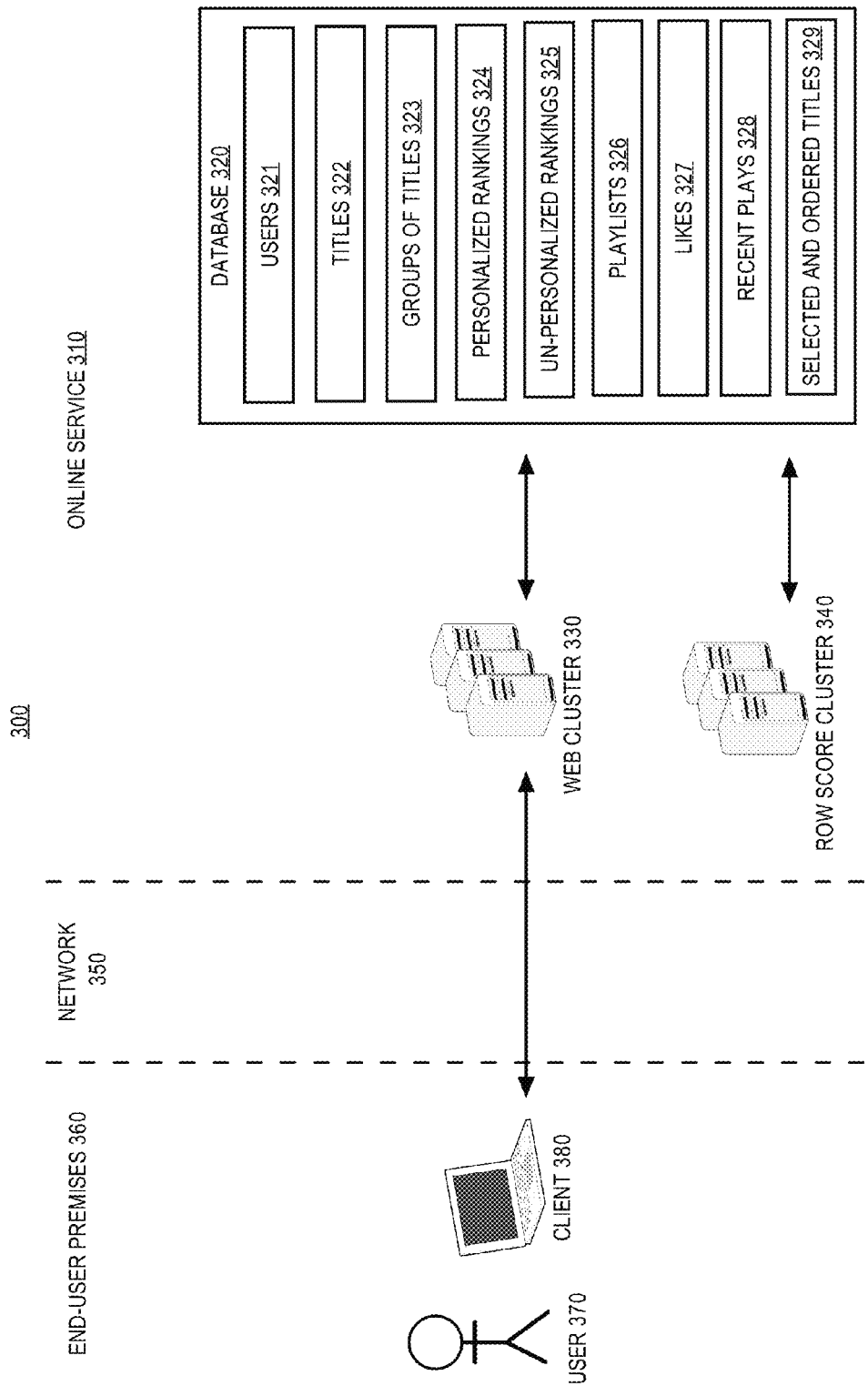
FIG. 3 is a block diagram of an online service environment in which an embodiment of the present invention is implemented.

FIG. 3 is a block diagram of an example online service environment 300 in which techniques of the present invention for selecting and ordering groups of titles may be implemented. Environment 300 includes one or more end-user premises 360, a network 350, and an online service 310. At each end-user premises 360 is at least one user 370 and a client computing device 380. Online service 310 has a web computing cluster 330, a row score computing cluster 340, and a database 320. Database 320 includes users data 321, titles data 322, groups of titles data 323, personalized title rankings data 324, un-personalized title rankings data 325, playlists data 326, likes data 327, recent plays data 328, and selected and ordered groups of titles data 329.

While in some embodiments the web computing cluster 330 and the row score computing cluster 340 involve different sets of computing devices, the web computing cluster 330 and the row score computing cluster 340 involve the same set or overlapping sets of computing devices in other embodiments. Thus, the distinction illustrated in FIG. 3 between servers of the web computing cluster 330 and servers of the row score computing cluster 340 is just one possible implementation and not a requirement of the invention.

Database 320 can actually be one or more databases, possibly distributed across one or more computing devices in one or more data centers. Users data 321 represents users or subscribers of online service 310. Users data 321 may include usernames and passwords or other information for authenticating the users of the online service 310 such that when the users interact with the online service 310 their individual identities can be established, for example, with a user identifier (e.g., an e-mail address or other unique user identifier). Titles data 322 represents the titles available for consumption by users 321 from the online service 310. Each title 322 may be associated with a title identifier for uniquely identifying the title. Title data 322 may also include other metadata information for titles 322 such as name data and graphical representation data for visually representing titles users 370 at clients 380. Groups of titles data 323 represents titles 322 as grouped into semantically meaningful groups. Each group of titles 323 can be an ordered set of one or more titles 322. Personalized rankings data 324 represents rankings of titles 322 for individual users 321. A personalized ranking for a given user 321 can include an ordered set of title 322 identifiers. Un-personalized rankings data 325 represents a ranking or rankings of titles 322 for sets of multiple users 321. An un-personalized ranking for a set of multiple users 321 can include an ordered set of title 322 identifiers. Playlists data 326 represents lists of titles for individual users 321 that the user has expressly added to a playlist. Likes data 327 represents lists of titles for individual users 321 the user has expressly recommended, liked, or favorably commented on. Recent plays data 328 represents lists of titles for individual users 312 the user has recently consumed. Recent plays data 328 may include timestamp data associated with recently played titles indicating when the title was last consumed by a user.

Row score computing cluster 340 generates and stores selected and ordered groups of titles data 329 for individual users 321 based on other data in database 320. Computing cluster 320 may be one or more computing devices in one or more data centers. Selected and ordered groups of titles data 329 for a given user 321 may include a set of row position indices (e.g., 1, 2, ..., P) and, for each row position index, an identifier of a group of titles 323 to fill the corresponding row position.

Web cluster 330 receives requests (e.g., HTTP or HTTPS requests) over network 350 for web pages from clients 380. In response to receiving a request from a particular user 370 of a client 380, web cluster 330 can return the selected and ordered groups of titles data 329 generated for that particular user 370. Upon receiving the selected and ordered groups of titles data 329 from web cluster 330, an application executing on the particular user's 370 client device 380 can present the selected and ordered groups of titles as recommendations. For example, the application may be a web browser and the selected and ordered groups of titles presented as recommendations on a web page. As another example, the application may be a dedicated client software application (e.g., a mobile application) and the selected and ordered groups of titles presented as recommendations in a graphical user interface window driven by the client software application.

Client 380 can be any one of a number of different types of personal computing devise including, but not limited to, a desktop computer, a smart phone, a tablet computer, a laptop computer, a set-top device, a video-gaming console, or any other computing device having, or being operatively coupled to, a video display and capable over communicating with web cluster 330 over network 350 from end-user premises 360.

Network 350 can include one or more of a wireless network, a wired network, a Local Area Network (LAN), a Wide Area Network (WAN), or the Internet. Wireless networks include, but are not limited to, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network).

General-Purpose Computer System

Figure 4:
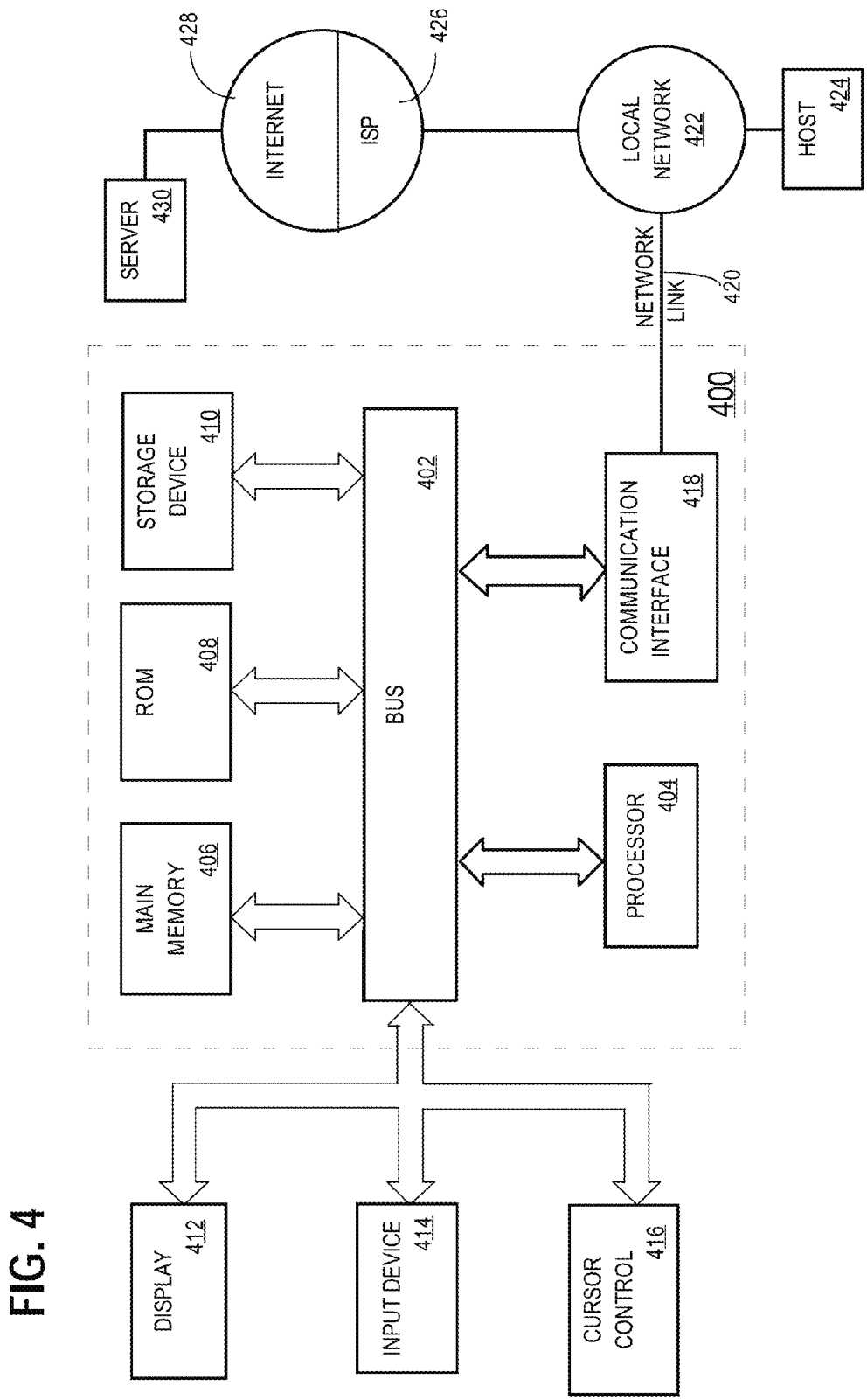
FIG. 4 is a block diagram of a general-purpose computer system suitable for implementing the techniques of the present invention.

In some embodiments, the techniques are implemented on a conventional or general-purpose computer system. For example, FIG. 4 is a block diagram that illustrates a computer system 400 in which some embodiments of the present invention may be embodied. Computer system 400 includes a bus 402 or other communication mechanism for communicating information, and a hardware processor 404 coupled with bus 402 for processing information. Hardware processor 404 may be, for example, a general purpose microprocessor or a system on a chip (SoC).

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404.

A storage device 410, such as a magnetic disk, optical disk, or solid-state drive is provided and coupled to bus 402 for storing information and instructions.

Computer system 400 may be coupled via bus 402 to a display 412, such as a liquid crystal display (LCD) or other electronic visual display, for displaying information to a computer user. Display 412 may also be a touch-sensitive display for communicating touch gesture (e.g., finger or stylus) input to processor 404.

An input device 414, including alphanumeric and other keys, is coupled to bus 402 for communicating information and command selections to processor 404.

Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more application-specific integrated circuits (ASICs), one or more field-programmable gate arrays (FPGAs), firmware, or program logic which, in combination with the computer system, causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

A software system is typically provided for controlling the operating of computer system 400. The software system, which is usually stored in main memory 406 and on fixed storage (e.g., hard disk) 410, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 400. The application(s) may be "loaded" into main memory 406 from storage 410 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computer system in accordance with instructions from OS and/or application(s). The graphical user interface also serves to display the results of operation from the OS and application(s).

Extensions and Alternatives

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising:
storing, for a user of an online service, a personalized ranking of a plurality of titles;
storing semantically meaningful groups of titles comprising the plurality of titles and formed based on criteria that groups titles together;
for each row position of a plurality of row positions, pre-selecting, from among the groups of titles, a group of titles to fill the each row position of the plurality of row positions based at least in part on a relevance score computed for each title in the group of titles, the relevance score for each title in the group of titles computed based at least in part on the personalized ranking of the each title in the personalized ranking of the plurality of titles;
generating and storing selected and ordered groups of titles data for the user of the online service, the selected and ordered groups of titles data for the user reflecting, for each row position of the plurality of row positions, the group of titles pre-selected to fill the each row position;
in response to a network request received from a computing device used by the user and having or being operatively coupled to a video display screen, based at least in part on the selected and ordered groups of titles data for the user, generating and sending a network response to the network request that causes at least a portion of each pre-selected group of titles to be visibly presented on the video display screen in the row position the each pre-selected group of titles is selected to fill; and
wherein the method is performed by one or more computing devices.

2. The method of claim 1, further comprising:
for each row position of the plurality of row positions, pre-selecting, from among the groups of titles, the group of titles to fill the row position of the plurality of row positions based at least in part on the relevance score computed for each title in the group of titles, the relevance score for each title in the group of titles computed based at least in part on the personalized ranking of the each title in the personalized ranking of the plurality of titles and an un-personalized ranking of the each title in an un-personalized ranking of the plurality of titles.

3. The method of claim 1, further comprising:
for each row position of the plurality of row positions, pre-selecting, from among the groups of titles, the group of titles to fill the each row position of the plurality of row positions based at least in part on the relevance score computed for each title in the group of titles and a diversity score computed for each title in the group of titles, the diversity score for each title in the group of titles computed based at least in part on similarity between titles in the group of titles and titles in one or more groups of titles that have already been selected to fill one or more row positions of the plurality of row positions.

4. The method of claim 1, further comprising:
for each row position of the plurality of row positions, pre-selecting, from among the groups of titles, the group of titles to fill the each row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles associated with a positive user interaction.

5. The method of claim 1, further comprising:
for each row position of the plurality of row positions, pre-selecting, from among the groups of titles, the group of titles to fill the row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles recently consumed.

6. The method of claim 1, further comprising:
for each row position of the plurality of row positions, pre-selecting, from among the groups of titles, the group of titles to fill the each row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles associated with a positive user recommendation, rating, or like.

7. The method of claim 1, further comprising:
for each row position of the plurality of row positions, pre-selecting, from among the groups of titles, the group of titles to fill the each row position of the plurality of row positions based at least in part on the relevance score computed for each title in the group of titles, a diversity score computed for each title in the group of titles, and a coverage score computed for each title in the group of titles, the diversity score for each title in the group of titles computed based at least in part on similarity between titles in the group of titles and titles in one or more groups of titles that have already been selected to fill one or more of the plurality of row positions, the coverage score for each title in the group of titles computed based at least in part on similarity between titles in the group of titles and titles in the plurality of titles associated with a positive user interaction.

8. The method of claim 1, further comprising:
wherein each row position, of the plurality of row positions, corresponds to a position on a web page.

9. The method of claim 1, wherein the personalized ranking comprises a ranking of titles in the plurality of titles from 1 to C, where C is a number of titles ranked in the personalized ranking.

10. The method of claim 1, wherein titles in the plurality of titles are movies.

11. One or more non-transitory computer-readable media storing instructions which, when executed by one or more computing devices, causes the one or more computing devices to perform:
storing, for a user of an online service, a personalized ranking of a plurality of titles;
storing semantically meaningful groups of titles comprising the plurality of titles and formed based on criteria that groups titles together;
for each row position of a plurality of row positions, pre-selecting, from among the groups of titles, a group of titles to fill the each row position of the plurality of row positions based at least in part on a relevance score computed for each title in the group of titles, the relevance score for each title in the group of titles computed based at least in part on the personalized ranking of the each title in the personalized ranking of the plurality of titles;
generating and storing selected and ordered groups of titles data for the user of the online service, the selected and ordered groups of titles data for the user reflecting, for each row position of the plurality of row positions, the group of titles pre-selected to fill the each row position; and
in response to a network request received from a computing device used by the user and having or being operatively coupled to a video display screen, based at least in part on the selected and ordered groups of titles data for the user, generating and sending a network response to the network request that causes at least a portion of each pre-selected group of titles to be visibly presented on the video display screen in the row position the each pre-selected group of titles is selected to fill.

12. The one or more non-transitory computer-readable media of claim 11, wherein the instructions, when executed by the one or more computing devices, further cause the one or more computing devices to perform:
for each row position of the plurality of row positions, pre-selecting, from among the groups of titles, the group of titles to fill the each row position of the plurality of row positions based at least in part on the relevance score computed for each title in the group of titles, the relevance score based at least in part on the personalized ranking of the each title in the personalized ranking of the plurality of titles and an un-personalized ranking of the each title in an un-personalized ranking of the plurality of titles.

13. The one or more non-transitory computer-readable media of claim 11, wherein the instructions, when executed by the one or more computing devices, further cause the one or more computing devices to perform:
for each row position of the plurality of row positions, pre-selecting, from among the groups of titles, the group of titles to fill the each row position of the plurality of row positions based at least in part on the relevance score computed for each title in the group of titles and a diversity score computed for each title in the group of titles, the diversity score for each title in the group of titles computed based at least in part on similarity between titles in the group of titles and titles in one or more groups of titles that have already been selected to fill one or more row positions of the plurality of row positions.

14. The one or more non-transitory computer-readable media of claim 11, wherein the instructions, when executed by the one or more computing devices, further cause the one or more computing devices to perform:
for each row position of the plurality of row positions, pre-selecting, from among the groups of titles, the group of titles to fill the each row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles associated with a positive user interaction.

15. The one or more non-transitory computer-readable media of claim 11, wherein the instructions, when executed by the one or more computing devices, further cause the one or more computing devices to perform:
for each row position of the plurality of row positions, pre-selecting, from among the groups of titles, the group of titles to fill the each row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles recently consumed.

16. The one or more non-transitory computer-readable media of claim 11, wherein the instructions, when executed by the one or more computing devices, further cause the one or more computing devices to perform:
for each row position of the plurality of row positions, pre-selecting, from among the plurality of groups of titles, the group of titles to fill the each row position of the plurality of row positions based at least in part on the relevance score computed for each title in the group of titles and a coverage score computed for each title in the group of titles, the coverage score for each title in the group of titles computed based at least in part on similarity between titles in the group of titles and titles in the plurality of titles associated with a positive user recommendation, rating, or like.

17. The one or more non-transitory computer-readable media of claim 11, wherein the instructions, when executed by the one or more computing devices, further cause the one or more computing devices to perform:
for each row position of the plurality of row positions, pre-selecting, from among the groups of titles, the group of titles to fill the row position of the plurality of row positions based at least in part on the relevance score computed for each title in the group of titles, a diversity score computed for each title in the group of titles, and a coverage score computed for each title in the group of titles, the diversity score for each title in the group of titles computed based at least in part on similarity between titles in the group of titles and titles in one or more groups of titles that have already been selected to fill one or more of the plurality of row positions, the coverage score for each title in the group of titles computed based at least in part on similarity between titles in the group of titles and titles in the plurality of titles associated with a positive user interaction.

18. The one or more non-transitory computer-readable media of claim 11, wherein each row position, of the plurality of row positions, corresponds to a position on a web page.

19. The one or more non-transitory computer-readable media of claim 11, wherein the personalized ranking comprises a ranking of the plurality of titles from 1 to C, where C is a number of titles ranked in the personalized ranking.

20. The one or more non-transitory computer-readable media of claim 11, wherein titles in the plurality of titles are movies.

21. A system comprising:
one or more databases storing a personalized ranking of a plurality of titles for a user and storing a plurality of semantically meaningful groups of titles comprising the plurality of titles and formed based on criteria that groups titles together;
one or more computing devices of a row score cluster configured to select, for each row position of a plurality of row positions, from among the plurality of groups of titles, a group of titles to fill the each row position of the plurality of row positions based at least in part on a relevance score computed for each title in the group of titles, the relevance score for each title in the group of titles computed based at least in part on the personalized ranking of the each title in the personalizing ranking of the plurality of titles;
one or more computing devices of the row score cluster configured to generate and store, in the one or more databases, selected and ordered groups of titles data for the user of the online service, the selected and ordered groups of titles data for the user reflecting, for each row position of the plurality of row positions, the group of titles pre-selected to fill the each row position; and
one or more computing devices of a web cluster configured to generate and send, in response to a network request received from a computing device used by the user and having or being operatively coupled to a video display screen, based at least in part on the selected and ordered groups of titles data for the user, a network response to the network request that causes at least a portion of each pre-selected group of titles to be visibly presented on the video display screen in the row position the each pre-selected group of titles is selected to fill.

* * * * *